(12) United States Patent
Hisada et al.

(10) Patent No.: US 11,502,429 B2
(45) Date of Patent: Nov. 15, 2022

(54) TERMINAL COVER

(71) Applicant: DENSO CORPORATION, Kariya (JP)

(72) Inventors: Motohide Hisada, Kariya (JP); Shinji Ando, Kariya (JP); Shinichi Sugiyama, Kariya (JP); Toshioki Iwai, Kariya (JP)

(73) Assignee: DENSO CORPORATION, Kariya (JP)

( * ) Notice: Subject to any disclaimer, the term of this patent is extended or adjusted under 35 U.S.C. 154(b) by 382 days.

(21) Appl. No.: 16/800,237

(22) Filed: Feb. 25, 2020

(65) Prior Publication Data
US 2020/0274261 A1    Aug. 27, 2020

(30) Foreign Application Priority Data

Feb. 25, 2019    (JP) .............................. JP2019-032012

(51) Int. Cl.
*H01R 4/70*    (2006.01)
*H02K 5/08*    (2006.01)
*H02K 5/22*    (2006.01)

(52) U.S. Cl.
CPC ................. *H01R 4/70* (2013.01); *H02K 5/08* (2013.01); *H02K 5/225* (2013.01)

(58) Field of Classification Search
None
See application file for complete search history.

(56) References Cited

U.S. PATENT DOCUMENTS 5,503,642 A * 4/1996 Lippert ............... H01M 50/571
429/65

FOREIGN PATENT DOCUMENTS

| EP | 2400593 A1 | 12/2011 |
| JP | 2002-141056 A | 5/2002 |
| JP | 4818034 B2 | 11/2011 |
| JP | 4920358 B2 | 4/2012 |
| JP | 2020-136225 A | 8/2020 |

* cited by examiner

*Primary Examiner* — Ross N Gushi
(74) *Attorney, Agent, or Firm* — Oliff PLC

(57) ABSTRACT

A terminal cover includes a cover body equipped with a curved portion and a base portion. The curved portion has formed therein a pair of claws diametrically opposed to each other. The claws are arranged at an interval away from each other. The interval is selected to be smaller than the width of the terminal and increased by elastic deformation of the cover body arising from installation of a terminal in the terminal cover, so that the claws retain the terminal. This structure enables the terminal cover to be simple and small-sized and facilitates installation of the terminal in the terminal cover without being scraped by the terminal when inserted into the terminal cover.

5 Claims, 10 Drawing Sheets

TERMINAL COVER

CROSS REFERENCE TO RELATED DOCUMENT

The present application claims the benefit of priority of Japanese Patent Application No. 2019-32012 filed on Feb. 25, 2019, the disclosure of which is incorporated herein by reference.

BACKGROUND

1 Technical Field

This disclosure relates generally to a terminal cover.

2 Background Art

There is known a resinous terminal cover shaped to electrically insulate and mechanically protect a metallic terminal to which an end of an electrical wire is connected and which is joined to an object using a bolt and a nut.

A terminal cover is also known which is designed to have a terminal protector equipped with a pair of trapezoidal protrusions shaped to improve ease with which terminals are inserted into the terminal protector and then secured thereto.

The above terminal cover, however, faces a drawback that when the metallic terminals are installed in a resinous terminal cover, they may mechanically scrape the terminal cover, so that swarf may be caught in fasteners of the terminal cover.

The terminal cover includes a cover body and a lid. The cover body is equipped with two parts: the terminal protector and a wire protector continuing from the terminal protector. The lid includes a front cover and a rear cover. The front cover covers an upper opening of the terminal protector. The rear cover covers an upper opening of the wire protector. In other words, the terminal cover is made up of a plurality of parts, and thus has a complicated structure and an increased size.

SUMMARY

It is, therefore, an object of this disclosure to provide a simple and small-sized terminal cover which is designed to facilitate assembly thereof without being scraped by a terminal when installed in the terminal cover.

According to one aspect of this disclosure, there is provided a terminal cover which is made of resin and designed to electrically insulate and mechanically protect a metallic terminal which is joined to an object using a bolt and a nut and includes a bolt seat with a bolt hole, a wire connector connecting with an end of an electrical wire, and a body located between the bolt seat and the wire connector.

The terminal cover includes a cover body and a pair of claws. The cover body includes a curved portion and a base portion. The curved portion is of a semicircular shape and has an open hole formed to coincide with the bolt seat of the terminal. The base portion is arranged adjacent the curved portion and located to coincide with the body of the terminal. The base portion includes a bottom plate. The claws are formed on the cover body and face each other across a reference plane defined to pass through the center of the open hole of the curved portion and extends between the curved portion and the base portion of the cover body. An interval between the claws when no pressure is applied thereto is selected to be smaller than a width of the terminal. The interval is increased by elastic deformation of the cover body arising from installation of the terminal in the terminal cover, so that the claws retain the body or the bolt seat of the terminal.

The elastic deformation of the cover body, as described above, results in an increase in interval between the claws, thereby enabling the terminal to be inserted into the terminal cover without any damage to the claws. The structure of the terminal cover is, therefore, enabled to be simple, small-sized, and improves the installation of the terminal in the terminal cover.

In the preferred mode, the claws are formed on two inner walls of the base portion which face each other across the reference plane for achieving retention of the body of the terminal. Each of the inner walls is isolated from the bottom plate of the base portion by cut-outs.

The pair of claws is shaped to retain the body of the terminal, thereby utilizing space where there is a low risk of physical interference with other parts. The cut-outs result in an increase in size of the curved portion, thereby facilitating elastic deformation of the cover body.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Embodiments will be described below with reference to the drawings. The same reference numbers will refer to same or similar parts throughout the embodiments. A terminal cover which will be described below in each embodiment is made from resin and designed to electrically insulate and mechanically protect a metallic terminal to which an end of an electrical wire is connected and which is joined to an object using a bolt and a nut.

Figure 1:
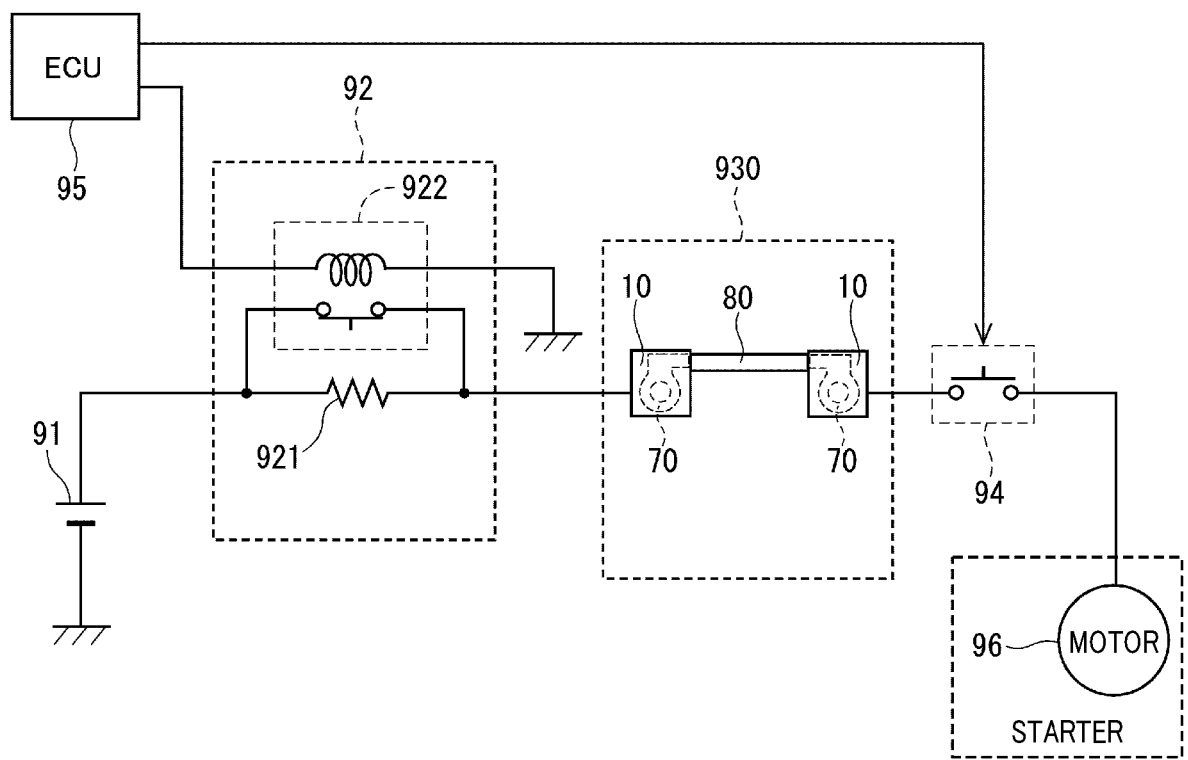
FIG. 1 is a circuit diagram which illustrates a power supply circuit for a starter with which terminal covers in each embodiment is used.

The terminal cover in this embodiment is used in, for example, a power supply circuit for an electrical motor of a starter mounted in a vehicle equipped with an idle-stop system. As illustrated in FIG. 1, the ICR (Inrush Current Reduction) relay 92 and the switch 94 are disposed between the battery 91 and the electrical motor 96.

The ICR relay 92 includes the resistor 921 arranged on one of parallel extending paths and the short-circuit relay 922 disposed on the other parallel extending path. The short-circuit relay 922 is opened or closed in response to a command signal from the ECU 95. When it is required to turn on the starter, the short-circuit relay 922 is turned off or opened, so that electrical current flows through the resistor 921, thereby minimizing inrush current. After an engine is started by the starter, the short-circuit relay 922 is turned on to close or short-circuit the parallel extending path, so that a large amount of current of approximately several tens of ampere [A] is delivered to the motor 96. Specifically, the switch 94 works to selectively energize or deenergize the motor 96 in response to a command from the ECU 95.

The ICR relay 92 and the switch 94 are electrically connected by the terminal cover-wire subassembly 930. The terminal cover-wire subassembly 930 includes the electrical wire 80 and metallic terminals 70 joined to ends of the electrical wire 80. The terminals 70 are joined using a bolt and a nut, not shown, to terminals (i.e., target objects) of the ICR relay 92 and the switch 94, respectively. The resinous terminal covers 10 cover the terminals 70 to electrically insulate the terminals 70 and also protect the terminals 70 from mechanical impact.

Japanese Patent No. 4920358 discloses a terminal cover designed to improve ease with which terminals are inserted into the terminal protector and then secured thereto, but however, encounters a drawback that when the metallic terminals are installed in the resinous terminal cover, they may mechanically scrape the terminal cover, so that swarf may be caught in fasteners of the terminal cover. Further, the terminal cover is made up of a plurality of parts, and thus has a complicated structure and an increased size.

The terminal cover in this embodiment is, therefore, designed to have a simple and small-sized structure and facilitates facilitate assembly thereof without being scraped by a terminal when installed in the terminal cover. The structure of the terminal covers will be described below in detail. Third digits of reference numbers used in the following embodiments for terminal covers indicate the numbers of the embodiments, respectively.

First Embodiment

Figure 2:
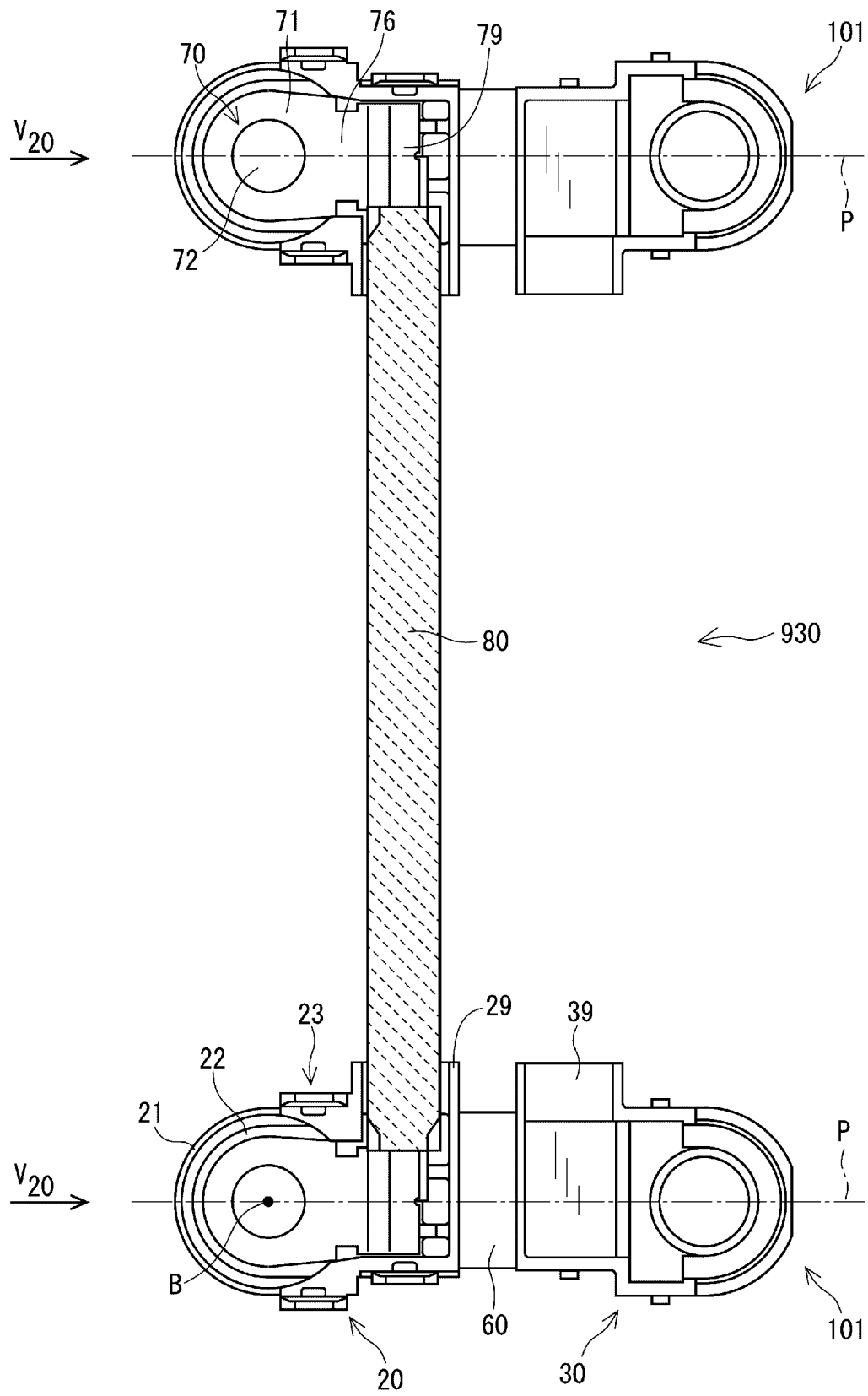
FIG. 2 is a plan view which illustrates a terminal cover-wire subassembly in the first embodiment.

The first embodiment will be described below with reference to FIGS. 2 to 8. FIG. 2 illustrates an entire structure of the terminal cover-wire subassembly 930 when the lid 30 is opened. In FIG. 2, the two terminal covers 101 are illustrated as being mounted on upper and lower ends of the electrical wire 80. An alternate long and short dash line extending horizontally through each of the terminal covers 101 represents an imaginary reference plane P whose definition will be discussed later in detail. Each of the terminal covers 101 in the first embodiment includes the wire retainer 29 which holds the electrical wire 80 so as to extend in a direction perpendicular to the reference plane P.

Specifically, when viewed in the direction $V_{20}$ in FIG. 2, an upper one of the terminal covers 101 (which will also be referred to below as an upper terminal cover) has the wire retainer 29 located on the right side of the reference plane P, while a lower one of the lower terminal covers 101 (which will also be referred to below as a lower terminal cover) has the terminal retainer 29 arranged on the left side of the reference plane P. In other words, the terminal covers 101 include a right terminal cover and a left terminal cover which have configurations bilaterally symmetrical with each other. For sake of simplicity of explanation, the following discussion will refer only to the lower terminal covers 101 illustrated in FIGS. 3(a), 3(b), 4(a), and 4(b).

Reference numbers on the upper side of FIG. 2 are mainly used to indicate parts of the terminal 70 attached to the upper terminal cover 101, while reference numbers on the lower side of the FIG. 2 mainly indicate parts of the lower terminal cover 101. Prior to reference to the structure of the terminal cover 101, the structure of the terminal 70 will be described below. The terminal 70 includes the bolt seat 71, the body 76, and the wire connector 79. The bolt seat 71 is of a substantially circular shape and has the bolt hole 72 formed in the center thereof. A bolt is inserted into the bolt hole 72 to connect the terminal 70 with a target object. The bolt seat 71 serves as a bearing surface for the head of the bolt or a nut. In other words, the bolt seat 72, as referred to herein, is used not only as a bolt seat, but also as a nut seat.

The body 76 is interposed between the bolt seat 71 and the wire connector 79. In the following discussion, a direction in which the bolt seat 71 and the body 76 are aligned with each other will also be referred to below as an axial direction of the terminal 70. Ideally, the axial direction of the terminal 70 coincides with the reference plane P. The wire connector 79 is joined to the electrical wire 80 by welding or pressure bonding.

Figure 3A:
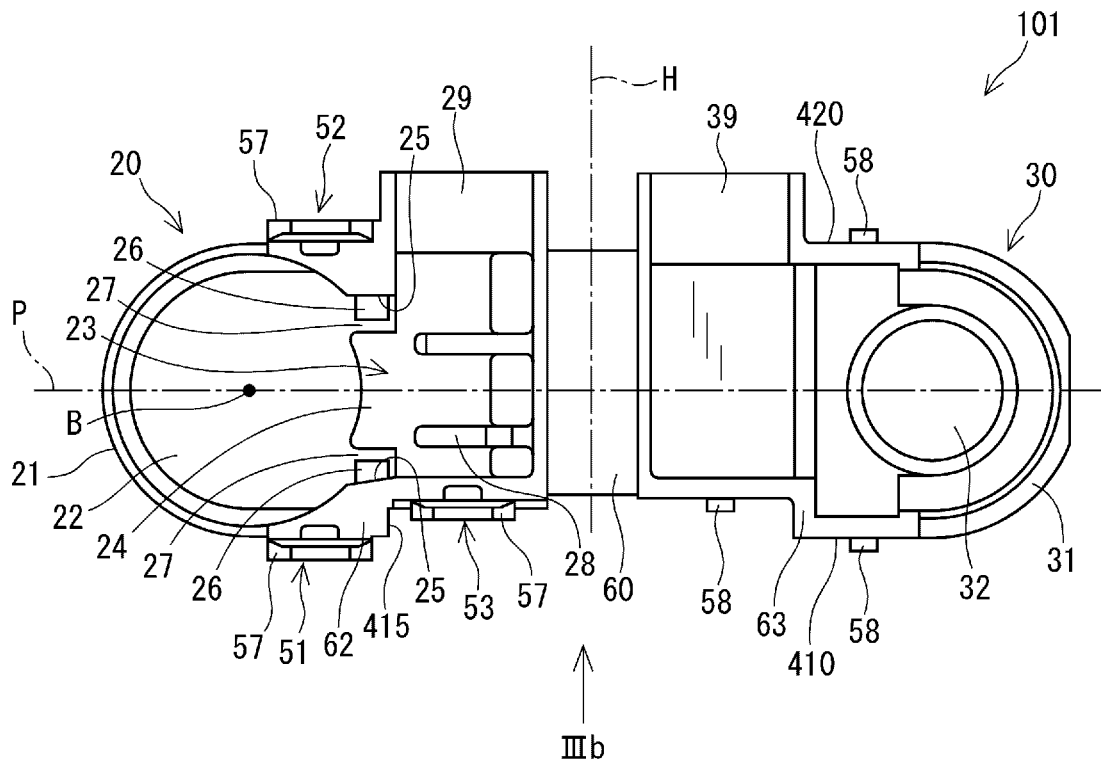
FIG. 3(a) is a plan view which illustrates a terminal cover when a lid is opened in the first embodiment.
Figure 3B:
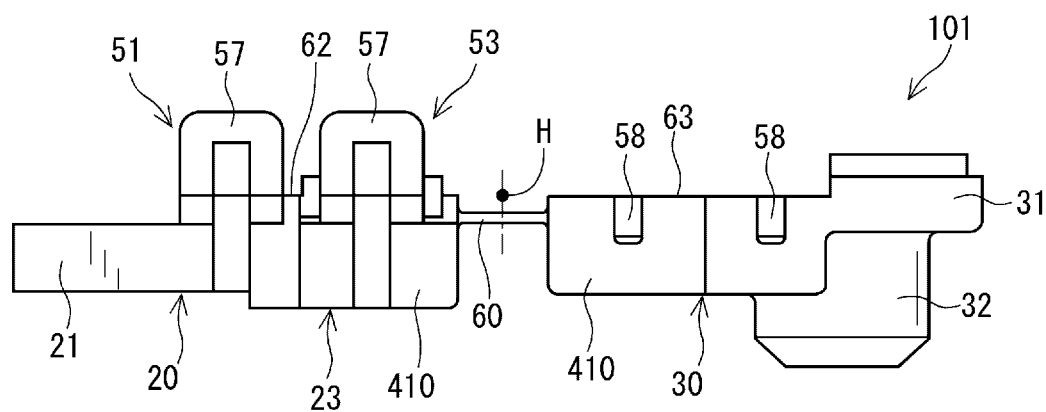
FIG. 3(b) is an illustration viewed in a direction IIIb in FIG. 3(a)
Figure 4A:
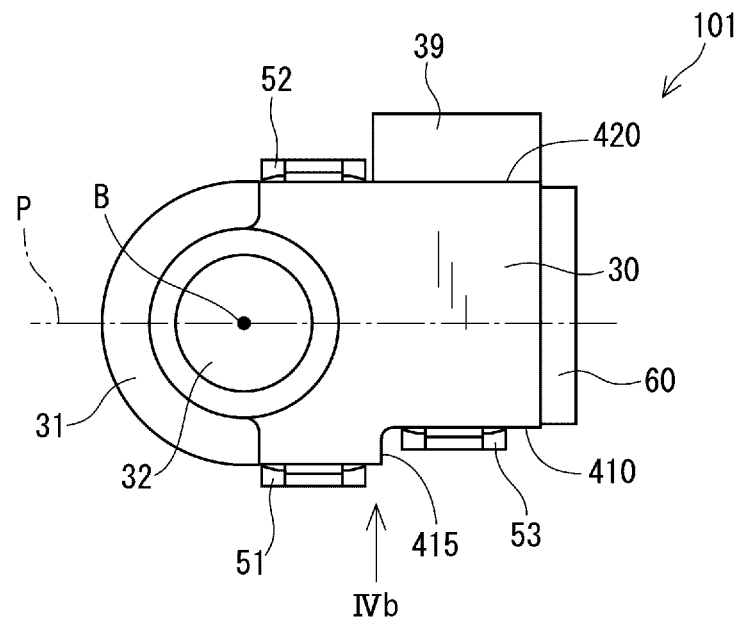
FIG. 4(a) is a plan view which illustrates a terminal cover when a lid is closed in the first embodiment.
Figure 4B:
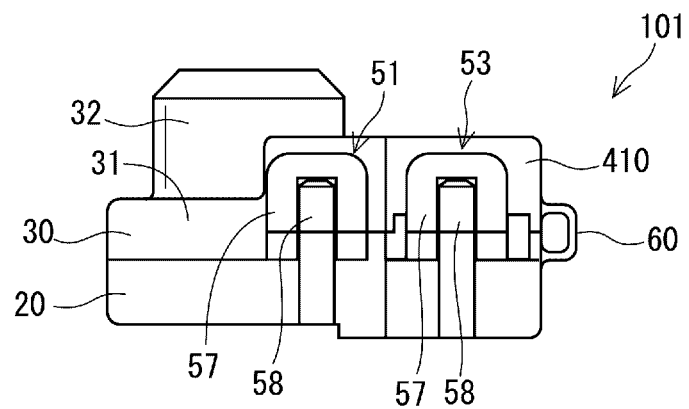
FIG. 4(b) is an illustration viewed in a direction IVb in FIG. 4(a)

The structure of the terminal cover 101 will be described with reference to FIG. 2 to FIG. 4(b). The terminal cover 101 includes the cover body 20, the lid 30, and the hinge 60. The lid 30 is rotatable about the rotation axis H of the hinge 60 to open or close the cover body 20. FIGS. 3(a) and 3(b) illustrate the lid 30 when opened. FIGS. 4(a) and 4(b) illustrate the lid 30 when closed. The terminal cover 101 is formed by a one-piece made from resin. Particularly, in a case of use in a starter for vehicles, PA66 (i.e., polyamide 66) which has a high heat resistance and a high mechanical strength may be preferably used as material of the terminal cover 101.

The cover body 20 includes the curved portion 21 and the base portion 23. The curved portion 21 is of a semi-circular shape and has the open hole 22 which substantially coincides with the bolt seat 71 of the terminal 70. The cover body 20 has a thin-walled portion around the open hole 22, so that the curved portion 21 is easily flexed. The base portion 23 is arranged adjacent the curved portion 21 and located in coincidence with the body 76 of the terminal 70. The base portion 32 includes the bottom plate 24. The base portion 23 having the bottom plate 24 is higher in rigidity than the curved portion 21. An imaginary plane which passes through the center B of the open hole 22 of the curved portion 21 and extends between the curved portion 21 and the base portion 23 is defined as the reference plane P.

The base portion 23 has two inner walls 25 which are opposed to each other through the reference plane P. Each of the inner walls 25 has the claw 26 formed thereon in the shape of a protrusion. The claws 26 face each other through the reference plane P and hold the body 76 of the terminal 70. Each of the inner walls 25 is isolated by the cut-out 27 from the bottom plate 24 of the base portion 23. The base portion 23 has the protrusion 28 which is located on an opposite side of the reference plane P to the wire retainer 29 and protrudes vertically from the bottom plate 24.

The hinge 60 is located on the opposite side of the base portion 23 of the cover body 20 to the curved portion 21 of the cover body 20 and has the rotation axis H extending perpendicular to the reference plane P. The hinge 60 is shaped to have a thin wall and also has relatively large rounded bases. When the snap-fits 51, 52, and 53 which will be described later in detail are released or unlocked, the elasticity of the hinge 60 will function to open the lid 30 over 90° to the cover body 20.

The configuration of the lid 30 is basically contoured to conform with that of the cover body 20. Specifically, the lid 30 includes the semicircular portion 31 contoured to conform with the curved portion 21 of the cover body 20. When the lid 30 is closed, the cylinder 32 of the lid 30 covers above the open hole 22 and houses the head of the bolt therein. The lid 30 also has the electric wire retainer 39 which retains therein the electrical wire 80 joined to the wire connector 79 of the terminal 70 together with the wire retainer 29 of the cover body 20.

When the lid 30 is closed, the end surface 62 of the cover body 20 will face the end surface 63 of the lid 30. When the cover body 20 is placed to face the lid 30 in such a way, the terminal cover 101 will have a side wall which is located on the opposite side of the reference plane P to the wire retainer 29 and will also be referred to below as the first side wall 410. Additionally, the terminal cover 101 will also have a side wall which is located on the same side of the reference plane P as the wire retainer 29 and will also be referred to below as the second side wall 420. In other words, the first side wall 410 and the second side wall 420 are arranged on the opposite sides of the reference plane P. The first side wall 410 has the shoulder 415 which is geometrically shaped to create a stepwise change in distance between the first side wall 410 and the reference plane P.

The terminal cover 101 is equipped with two snap-fits 51 and 53 on the first side wall 410 and a single snap-fit 52 on the second side wall 420. Each of the snap-fits 51, 52, and 53 is made up of the snap-in recessed portion 57 formed in the cover body 20 and the protrusion 58 formed on the lid 30.

The snap-in recessed portion 57 is of a frame shape with a rectangular opening. Specifically, the snap-in recessed portion 57 includes a frame extending from the side wall 410 or 420 of the cover body 20 over the end surface 62 away from the bottom plate 24. The protrusion 58 projects from the side wall 410 or 420 of the lid 30. The outline of the protrusion 58 is of a rectangular shape as viewed from outside the side wall 410 or 420 and fit in the rectangular opening of the snap-in recessed portion 57. When the lid 30 is closed, the snap-in recessed portion 57 is snap-fitted on the protrusion 58, thereby causing the lid 30 to be kept closed against the elasticity of the hinge 60.

Figure 5A:
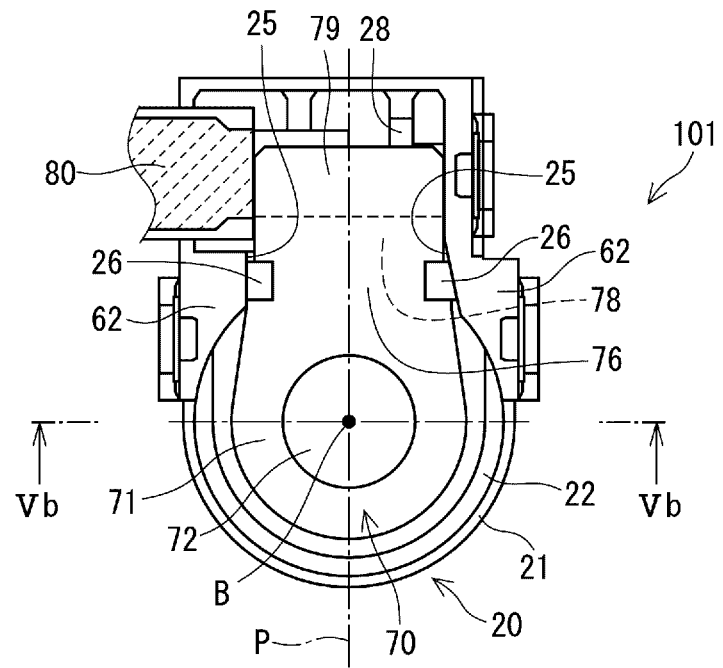
FIG. 5(a) is a plan view which illustrates a terminal cover in which a terminal is installed according to the first embodiment.

The structure of the terminal cover 101 in which the terminal 70 is installed will be described below in detail with reference to FIGS. 5(a) to 6(b). The terminal covers 101 in FIGS. 5(a) and 6(a) are different only in orientation of 90° from each other. FIG. 6(a) is provided in association with a transverse section of FIG. 6(b).

After assembled with the terminal cover 101, the body 76 of the terminal 70 is, as described already with reference to FIG. 2, retained by the claws 26. The claws 26 are formed on the inner walls 25 of the base portion 23 which face each other across the reference plane P. Each of the claws 26, as clearly illustrated in FIG. 5(b), has the slant surface 261 which faces the end surface 62 and obliquely extends from the inner wall 25 toward the bottom plate 24 and the reference plane P. Each of the claws 26 also has the lower surface 263 which faces the bottom plate 24 and extends substantially parallel to the bottom plate 24. The intersection of the slant surface 261 and the lower surface 263 forms the top surface 262 which has a dimension relatively smaller in the vertical direction (i.e., the thickness-wise direction) of the terminal cover 101.

The bottom plate 24 of the base portion 23 disposed between the inner walls 25 is, as already described with reference to FIG. 3(a), isolated from the inner walls 25 by the cut-outs 27 leading to the open hole 22. This facilitates deflection of the inner walls 25 in a direction in which the inner walls 25 move close to or away from each other without being restrained by the bottom plate 24. In other words, the cut-outs 27 serve to facilitate elastic deformation of the cover body 20 with the aid of the elasticity of resin material of the cover body 20.

Figure 5B:
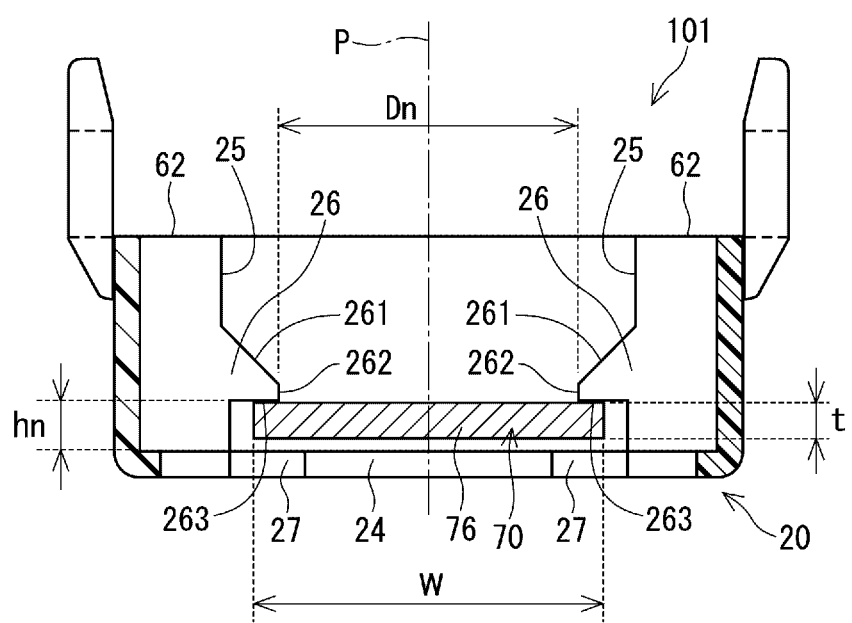
FIG. 5(b) is an enlarged sectional view taken along the line Vb-Vb in FIG. 5(a)
Figure 6A:
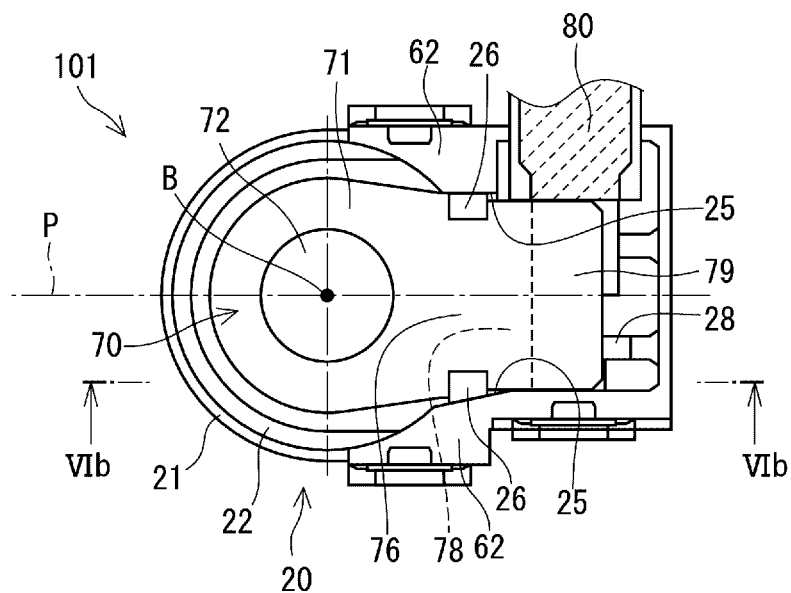
FIG. 6(a) is a plan view which illustrates a terminal cover oriented at an angle different from FIG. 5(a) by 90°.

When no physical load is exerted on the terminal cover 101, a minimum distance between the claws 26, e.g., an interval Dn between the top surfaces 262 of the claws 26 is, as clearly illustrated in FIG. 5(b), smaller than the width W of the body 76 of the terminal 70. The height hn between the lower surface 263 of each of the claws 26 and the bottom plate 24 is greater than the thickness t of the terminal 70. When the terminal 70 is pressed against the slant surfaces 261 of the claws 26 in order to install the terminal in the terminal cover 101, it will result in elastic deformation of the cover body 20, which increases the interval between the claws 26, thereby causing the terminal 70 to be inserted into space between the claws 26 and the bottom plate 24. The installation of the terminal 70 in the terminal cover 101 will also be described later in detail with reference to FIGS. 7(a) to 8(e).

Figure 6B:
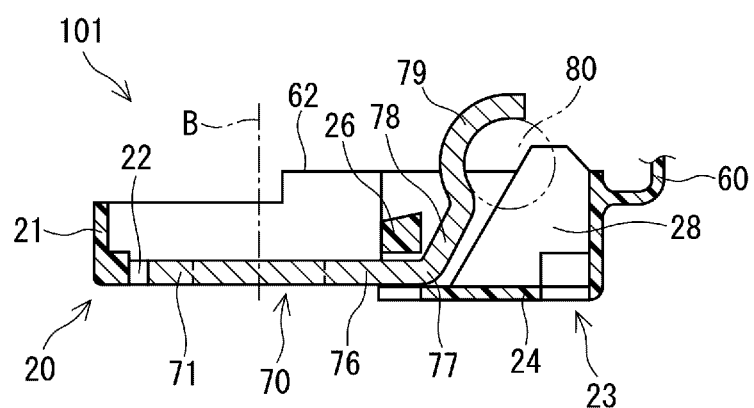
FIG. 6(b) is a sectional view taken along the line VIb-VIb in FIG. 6(a)
Figure 7A:
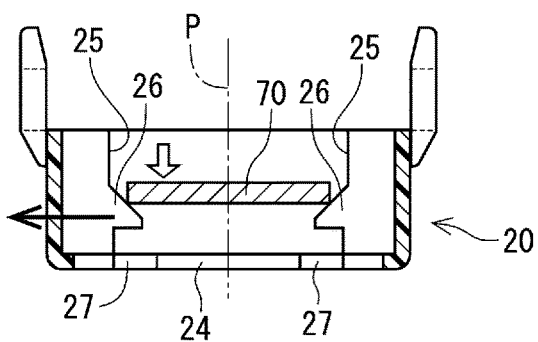
FIGS. 7(a) to 7(e) are views which demonstrate how to assemble a terminal cover in the first embodiment.
Figure 7B:
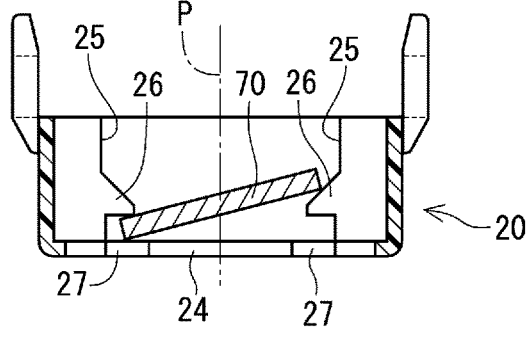
Figure 7C:
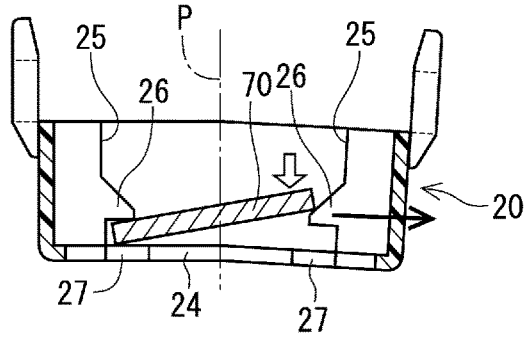
Figure 7D:
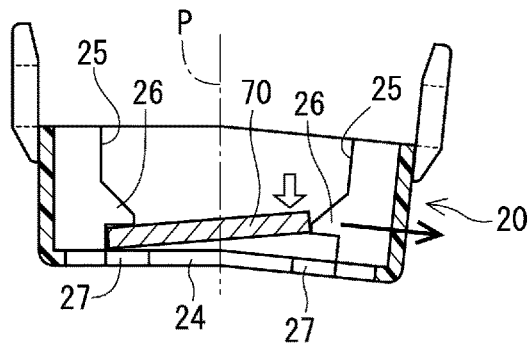
Figure 7E:
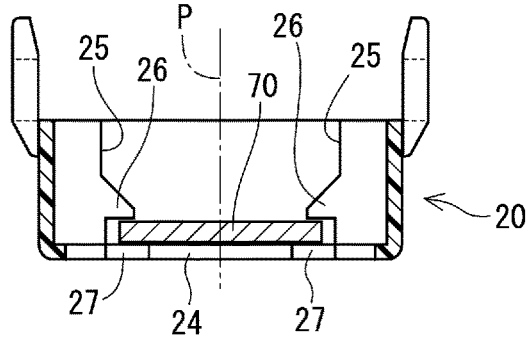

FIG. 6(b) demonstrates a vertical cross section of configuration of the terminal 70. The wire connector 79 continues to the bend 77 through the slant portion 78. The bend 77 is located adjacent the body 76. Specifically, the wire connector 79 is located above the surfaces of the bolt seat 71 and the body 76 near the end surface 62. The slant portion 78 is inclined from the bend 77 (i.e., a major surface of the terminal 70) toward the wire connector 79.

The base portion 23 of the terminal cover 101 is equipped with the protrusion 28 which extends from the bottom plate 24 and holds the slant portion 78 of the terminal 70 between itself and each of the claws 26. In the first embodiment, the protrusion 28 is shaped to have a slant major surface extending from the bottom plate 24 substantially parallel to the slant portion of the terminal 70. In other words, the slant major surface of the protrusion 28 is inclined from the bottom plate 24 at substantially the same angle as that at which the slant portion 78 is inclined to the bottom plate 24 (i.e., the body 76). The protrusion 28, therefore, retains the slant portion 78 of the terminal 70 in a surface-to-surface contact. The protrusion 28 may alternatively be shaped to have a major surface which extends vertically from the bottom plate 24, when the side of the protrusion 28 is viewed, to have a top edge retaining the slant portion 78 of the terminal 70 in a line-to-line contact.

FIGS. 7(a) to 8(e) demonstrate installation of the terminal 70 in two different ways. FIGS. 7(a) to 7(e) are transverse sections of the terminal 101 corresponding to FIG. 5(b) and illustrate a sequence of movements of the terminal 70 when downward pressure is exerted on the terminal 70 placed on the slant surfaces 261 of the claws 26. The same is true of FIGS. 8(a) to 8(e). The exertion of downward pressure on the slant surfaces 261 of the claws 26 will cause the cover body 20 to be elastically expanded outward, thereby causing the terminal 70 to pass through the claws 26 and then be caught in space between the claws 26 and the bottom plate 24. In FIGS. 7(a) to 8(e), pressure forcing the terminal 70 against the claws 26 is indicated by a block arrow. The deformation of the cover body 20 is indicated by a thick arrow.

In the example in FIGS. 7(a) to 7(e), the downward pressure is first applied to the left side of the terminal 70 and then to the right side of the terminal 70. Specifically, in the first step illustrated in FIG. 7(a), the downward pressure is exerted on the left side of the terminal 70. In the second step in FIG. 7(b), the left side of the terminal 70 is forced below the claw 26. Subsequently, in the third step in FIG. 7(c), the downward pressure is exerted on the right side of the terminal 70. The right side of the terminal 70 is then forced below the claw 26 in the fourth and fifth steps in FIGS. 7(d) and 7(e). In the final step, i.e., the fifth step in FIG. 7(e), the cover body 20 is elastically restored to an initial state, so that the claws 26 firmly retain the terminal 70 (i.e., the body 76 between themselves and the bottom plate 24.

Figure 8A:
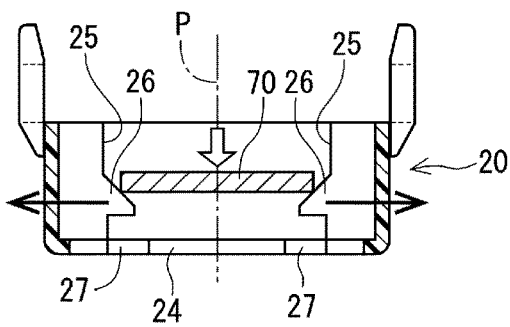
FIGS. 8(a) to 8(e) are views which demonstrate how to assemble a terminal cover in a way different from that in FIGS. 7(a) to 7(e)
Figure 8B:
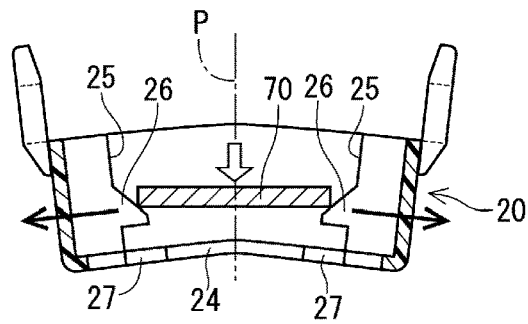
Figure 8C:
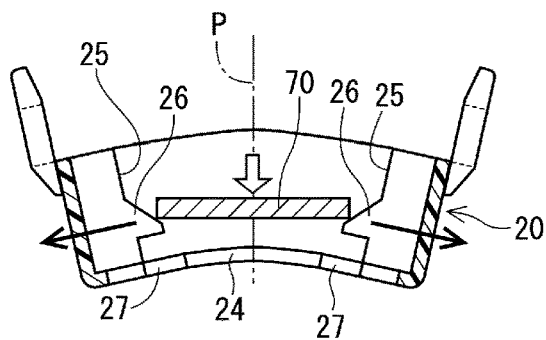
Figure 8D:
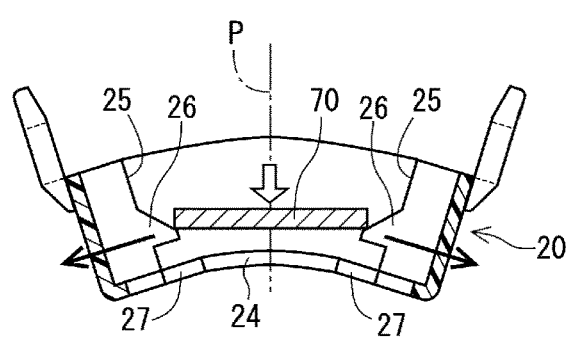
Figure 8E:
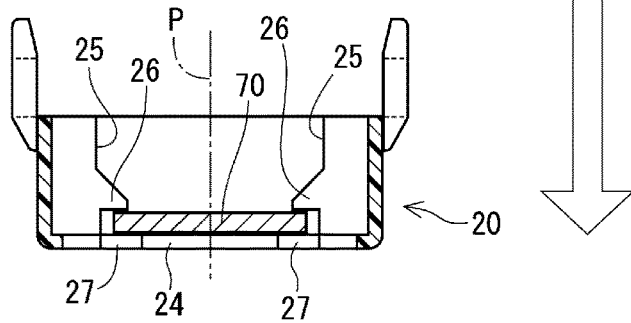

In the second example in FIGS. 8(a) to 8(e), the downward pressure is exerted on the middle of width of the terminal 70 in the first step illustrated in FIG. 8(a). In the second to fourth steps illustrated in FIGS. 8(b) to 8(d), the downward pressure is exerted on the slant surfaces 261 of the claws 26 to create forces acting on the cover body 20 to expand it in opposite lateral directions. When the interval Dn between the claws 26 is increased to the width W of the terminal after the fourth step illustrated in FIG. 8(d), it will cause the terminal 70 to be forced into space between the claws 26 and the bottom plate 24. In the final fifth step illustrated in FIG. 8(e), the terminal 70 is, like in the first example, retained by the claws 26.

Beneficial Advantage

A) The resinous terminal cover 101 has formed on the cover body 20 the two claws 26 which face each other across the reference plane P. When no pressure is exerted on the terminal cover, the interval Dn between the claws 26 is selected to be smaller than the width W of the terminal 70, but increased upon elastic deformation of the cover body 20 when the terminal 70 is installed in the terminal cover 101, thereby firmly retaining the body 76 of the terminal 70 in the terminal cover 101.

The elastic deformation of the cover body 20, as described above, results in an increase in interval between the claws 26, thereby enabling the terminal 70 to be inserted into the terminal cover 101 without any damage to the claws 26. The structure of the terminal cover 101 is, therefore, enabled to be simple and small-sized, and improves the installation of the terminal 70 in the terminal cover 101. The structure of the terminal cover 101 eliminates a risk of damage to the claws 26, thus ensuring the stability in retaining the terminal 70 in the terminal cover 101, and also eliminates a risk that swarf may be caught in, for example, the wire connector 79 to lower electrical conductivity between the terminal 70 and the wire 80.

B) The claws 26 are disposed on the inner walls 25 of the base portion 23 which face each other across the reference plane P. The inner walls 25 are isolated from the bottom plate 24 of the base portion 23 by the cut-outs 27.

The pair of claws 26 is shaped to retain the body 76 of the terminal 70, thereby utilizing space where there is a low risk of physical interference with other parts. The cut-outs 27 result in an increase in size of the curved portion 21, thereby facilitating elastic deformation of the cover body 20. This enables the degree to which the claws 26 catch the terminal 70 to be increased, thereby ensuring the stability in retention of the terminal 70 in the terminal cover 101.

C) The terminal 70 includes the bolt seat 71 and the slant portion 78 which is inclined from the surface of the body 76 toward the wire connector 79. The base portion 23 of the terminal cover 101 has the protrusion 28 which extends vertically from the bottom plate 24 and holds or retains the slant portion 78 of the terminal 70 between itself and the claws 26.

The pair of claws 26 and the protrusion 28 create a three-point support for the terminal 70, thereby enhancing the degree of retention of the terminal 70. This enables the terminal 70 to be carried while being temporarily fixed on the cover body 20 with the lid 30 opened without being undesirably dropped off, thereby facilitating attachment of the terminal cover 101 to an object using a bolt and a nut. The three-point support ensures the stability in retention of the terminal 70 without need for additional parts, thereby enabling the terminal cover 101 to be designed in a simple and small-sized shape and reduced in weight thereof.

D) The protrusion 28 is shaped to have a slant major surface which is inclined from the bottom plate 24 at substantially the same angle as that at which the slant portion 78 is inclined from the bottom plate 24. This causes the protrusion 28 to support the terminal 70 in a surface-to-surface contact, thereby improving the reliability in retaining the terminal 70 and also minimizing partial mechanical wear of the protrusion 28 resulting from concentration of stress thereon.

E) The terminal cover 101 includes the hinge 60 and the lid 30 which is rotatable about the hinge 60 to open or close the cover body 20. The use of the lid 30 with the terminal cover 101 improves the electrical insulation and physical protection of the terminal 70. The cover body 20 and the lid 30 may be made integrally through the hinge 60 in the form of a one-piece resinous part, thereby decreasing the number of parts of the terminal cover 101 or the number of production parts, such as molds.

The wire retainer 29 of the cover body 20 retains the electrical wire 80 so as to have a length extending perpendicular to the reference plane P. In a case where the electrical wire 80 is retained and oriented in the axial direction of the terminal 70, when the electrical wire 80 is pulled by external force, it creates tension withdrawing the terminal 70 from the claws 26. In contrast, in a case where the length of the electrical wire 80 is inclined relative to or extends, like in the first embodiment, perpendicular to the axial direction of the terminal 70, there is a low risk that the terminal 70 may be withdrawn from the claws 26 when the electrical wire 80 is pulled. This improves the reliability in retaining the terminal 70 in the terminal cover 101.

Second and Third Embodiments

Figure 9A:
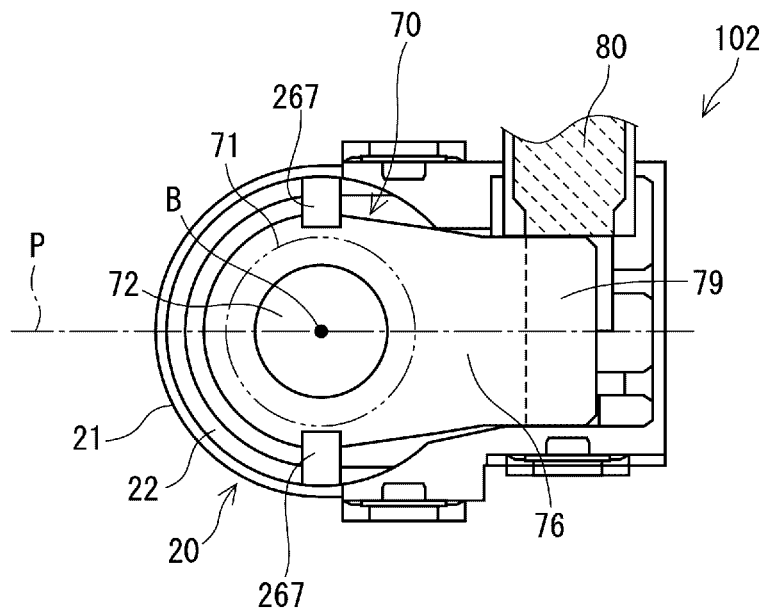
FIG. 9(a) is a plan view which illustrates a terminal cover in which a terminal is installed according to the second embodiment.

The second and third embodiment which are different in number or layout of claws from the first embodiment will be described below with reference to FIGS. 9(a) and 9(b). FIG. 9(a) illustrates the terminal cover 102 according to the second embodiment. The terminal cover 102 has a pair of claws 267 arranged on an inner wall of the curved portion 21. The claws 267 are diametrically opposed to each other across the reference plan P, i.e., the center B of the open hole 22. The claws 267 retain portions of the bolt seat 71 of the terminal 70 which are diametrically opposed to each other in the width-wise direction of the terminal 70 without physical interference with a head of a bolt indicated by an alternate long and short dash line. When the terminal 70 is installed in the terminal cover 102, the curved portion 21 is flexed to increase the interval between the claws 267, so that the terminal 70 passes the claws 267 and is then retained by the claws 267.

Figure 9B:
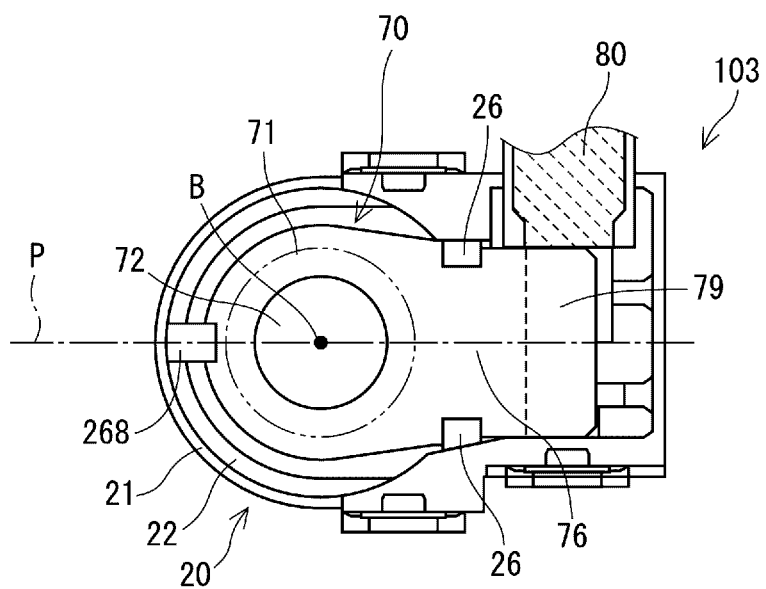
FIG. 9(b) is a plan view which illustrates a terminal cover in which a terminal is installed according to the third embodiment.

FIG. 9(b) illustrates the terminal cover 103 according to the third embodiment. The terminal cover 103 is, like in the first embodiment, equipped with a pair of claws 26 and also includes the third claw 268 arranged on the inner wall of the curved portion 21 in alignment with the reference plane P. The third claw 268 retains a top portion of the bolt seat 71 of the terminal 70 without physical interference with a head of a bolt indicated by an alternate long and short dash line. Like in the third embodiment, the terminal cover in each of the above embodiments may be equipped with an additional claw(s) to retain the terminal 70.

Fourth Embodiment

Figure 10:
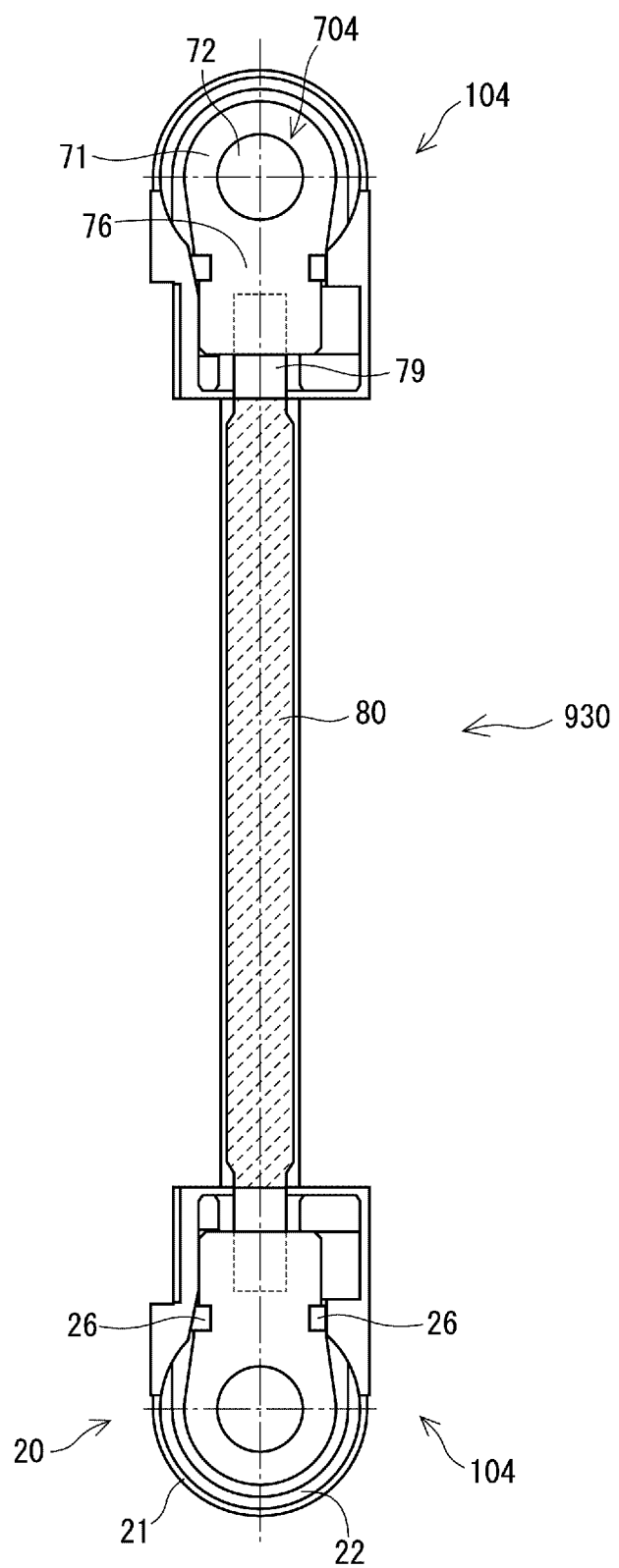
FIG. 10 is a plan view which illustrates a terminal cover-wire subassembly in the fourth embodiment.

FIG. 10 illustrates the terminal covers 104 according to the fourth embodiment which is different in orientation of the terminal covers 104 relative to the electrical wire 80 from the first embodiment. FIG. 10 shows the terminal cover-wire subassembly 930. The electrical wire 80 is joined to the wire connectors 794 of the terminal covers 104. Each of the wire connectors 794 is aligned with the axial direction of a corresponding one of the terminals 704. In other words, the electrical wire 80 is joined to the terminal covers 104 with a length thereof extending in the axial direction of the terminals 704. Each of the terminal covers 104 is formed only by the cover body 20. In other words, the terminal cover 104 is not equipped with the hinge 60 and the lid 30 in the first embodiment. The structure of the terminal cover 104 offers the beneficial advantages A) and B) described above.

The terminal cover 104 may alternatively be equipped with a lid with no hinge which closes the cover body 20. The terminal cover 104 may alternatively be equipped with a hinge which is arranged in a side wall of the cover body 20 and enables the cover body 20 to be opened or closed around an axis extending parallel to the reference plane P. The electrical wire 80 may be oriented to extend at a given angle (e.g., 45°) greater than 0° and smaller than 90° to the axial direction of the terminal 704. The terminal 70 may include the slant portion 78. In this case, the terminal cover 104 may have the protrusion 28, like in the first embodiment, which protrudes from the bottom plate 24 of the base portion 23.

Other Embodiments

Each of the claws 26 illustrated in FIG. 5(b) in the first embodiment has the slant surface 261 inclined straight at a constant angle or gradient when a cross section thereof is viewed, but however, the slant surface 261 may be of another shape, such as curved or bent shape.

The terminal covers 101, 102, 103, and 104 may also be used for wire connection other than that in the power supply circuit for the starter motor.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A terminal cover which is made of resin and designed to electrically insulate and mechanically protect a metallic terminal which is joined to an object using a bolt and a nut and includes a bolt seat with a bolt hole, a wire connector connecting with an end of an electrical wire, and a body located between the bolt seat and the wire connector, the terminal cover comprising:
   a cover body which includes a curved portion and a base portion, the curved portion being of a semicircular shape and having an open hole formed to coincide with the bolt seat of the terminal, the base portion being arranged adjacent the curved portion and located to coincide with the body of the terminal, the base portion including a bottom plate; and
   a pair of claws which are formed on the cover body and face each other across a reference plane defined to pass through a center of the open hole of the curved portion and extend between the curved portion and the base portion of the cover body, wherein
   an interval between the claws when no pressure is applied to the claws is selected to be smaller than a width of the terminal, the interval being increased by elastic deformation of the cover body arising from installation of the terminal in the terminal cover, so that the claws retain the body or the bolt seat of the terminal,
   the claws are formed on two inner walls of the base portion which face each other across the reference plane for achieving retention of the body of the terminal, and
   each of the inner walls is isolated from the bottom plate of the base portion by cut-outs.

2. The terminal cover as set forth in claim 1, wherein the terminal also includes a slant portion which is inclined from a major surface thereof toward the wire connector, and wherein the base portion has formed thereon a protrusion which extends from the bottom plate and retains the slant portion of the terminal between itself and the claws.

3. The terminal cover as set forth in claim 2, wherein the protrusion has a slant major surface which is inclined from the bottom plate at substantially the same angle as that at which the slant portion of the terminal is inclined.

4. The terminal cover as set forth in claim 1, further comprising a hinge and a lid, the hinge being arranged on an opposite side of the base portion of the cover body to the curved portion and having a rotation axis which extends perpendicular to the reference plane, the lid being rotated around the hinge to open or close the cover body, and wherein the cover body retains the electrical wire so as to have a length extending perpendicular to the reference plane.

5. A terminal cover which is made of resin and designed to electrically insulate and mechanically protect a metallic terminal which is joined to an object using a bolt and a nut and includes a bolt seat with a bolt hole, a wire connector connecting with an end of an electrical wire, and a body located between the bolt seat and the wire connector, the terminal cover comprising:
- a cover body which includes a curved portion and a base portion, the curved portion being of a semicircular shape and having an open hole formed to coincide with the bolt seat of the terminal, the base portion being arranged adjacent the curved portion and located to coincide with the body of the terminal, the base portion including a bottom plate;
- a pair of claws which are formed on the cover body and face each other across a reference plane defined to pass through a center of the open hole of the curved portion and extend between the curved portion and the base portion of the cover body; and
- a hinge and a lid, the hinge being arranged on an opposite side of the base portion of the cover body to the curved portion and having a rotation axis which extends perpendicular to the reference plane, the lid being rotated around the hinge to open or close the cover body, wherein
- an interval between the claws when no pressure is applied to the claws is selected to be smaller than a width of the terminal, the interval being increased by elastic deformation of the cover body arising from installation of the terminal in the terminal cover, so that the claws retain the body or the bolt seat of the terminal, and
- the cover body retains the electrical wire so as to have a length extending perpendicular to the reference plane.

* * * * *